United States Patent [19]

Greene

[11] 3,873,836
[45] Mar. 25, 1975

[54] CHARGE COUPLED RADIATION DETECTOR IMAGING SYSTEM

[75] Inventor: Richard F. Greene, Bethesda, Md.

[73] Assignee: The United States of America as represented by the Secretary of the Navy, Washington, D.C.

[22] Filed: Apr. 19, 1974

[21] Appl. No.: 462,483

[52] U.S. Cl. ............... 250/330, 250/338, 250/370
[51] Int. Cl. ............................................. G01j 5/00
[58] Field of Search ............... 250/330, 338, 370

[56] References Cited
UNITED STATES PATENTS 3,727,057  4/1973  Higby et al. .................. 250/338
3,731,119  5/1973  Matzen ........................ 250/370
3,833,812  9/1974  Reilly et al. .................. 250/330

Primary Examiner—Archie R. Borchelt
Attorney, Agent, or Firm—R. S. Sciascia; J. A. Cooke; W. W. Cochran

[57] ABSTRACT

A detector of radiation in the 1 to 14 micron region having the capability of suppression of element-to-element inhomogeneity interacting with background radiation.

3 Claims, 3 Drawing Figures

PRIOR ART: SINGLE CELL

CHARGE COUPLED RADIATION DETECTOR IMAGING SYSTEM

BACKGROUND OF THE INVENTION

Well known infrared detectors operate on a number of different physical phenomena. These include: photoconductivity in narrow gap or impurity semiconductors; photovoltaic effects at pn junctions in narrow gap semiconductors, or at Schottky and other surface barriers; bolometric effects; absorption in superconducting Josephson junction; electron emission at photocathodes; and others. For a number of applications it is desirable to produce an image of the infrared source or scatterer.

Various devices exist for imaging the detector signals. One type of infrared imaging device employs a single photosentitive element which must be sequentially illuminated by different portions of an image, using mechanical or other scanning devices. Other kinds of imaging devices employ two dimensional arrays of photosensitive elements, each of which receives and detects the infrared intensity of a definite segment of the image. Similarly, some devices employ a continuous large area of usually amorphous detector which may be scanned, e.g., by an electron beam. Furthermore, there are intermediate schemes utilizing one dimensional arrays of detectors, each of which has a particular set of image segments focussed sequentially upon it. Although they are less expensive and easier to fabricate, the one dimensional arrays are not able to integrate a weak incident flux density over a fairly long time and thus lack a high potential sensitivity obtainable by the two dimensional arrays. The single element detectors however avoid the difficulties of making each element of a mosiac equally sensitive.

Recently, silicon technology charge coupled devices (CCD), using two-dimensional array of shift registers, have been used successfully as image devices in the visible spectrum. They offer several important advantages over competitive visible imagers: (a) use of standard silicon integrated circuit technology; (b) direct video signal output; (c) self scanning and other signal processing capabilities; (d) extreme compactness; (e) high reliability; and, (f) compatibility with silicon based system electronics.

For the above-mentioned reasons it would be highly desirable to adapt the silicon CCD technology to infrared rather than visible imaging. This cannot be done with silicon itself because the silicon absorption edge occurs at a wave length too short for a silicon response. Various schemes for bypassing this difficulty have been proposed. One such scheme is to fabricate the CCD in a narrow gap semiconductor, such as GeTe, PbS, PbTe, InSb, PbSbTe, PbSbSe, HgCdTe, etc., which would provide electron-hole generation in the infrared spectral region. The difficulty with such a scheme is that neither sufficiently low carrier recombination rates for storage in a CCD "Bucket" nor sufficiently good uniformity of "buckets" have been achieved in semiconductors other than silicon. Another approach is to use an epitaxial heterojunction layer of small gap semiconductor grown on, e.g., the back of a thin silicon chip which has a two-dimensional CCD array on the front. The basic idea of such a device is that infrared radiation is absorbed in the small gap semiconductor, producing electron-hole pairs, one kind of which is injected across a heterojunction into the silicon and then swept or diffused across the silicon chip onto the CCD register. This kind of device suffers from several difficulties relating to the injection process: (a) device quality epitaxial layers have to be grown; (b) interface recombination center density must be low and uniform, and; (c) the relative work function must be such as to favor injection of the desired carrier.

An infrared CCD image device based on somewhat different operating principles has been disclosed by Richard F. Greene et al in Application Ser. No. 416,300 entitled Photoconductively Activated Gated Infrared Charge Coupled Device, now U.S. Pat. No. 3,842,274. The Greene device consists of an array of charge coupled elements controlled by capacitive coupling through the oxide layer of the semiconductor substrate by a photoconductive resistor. The photoconductive resistor changes the voltage on the gate of the charge coupled element upon detection of infrared light to open a channel for minority carriers to flow from the source to the drain of the charge coupled element. The drains of the array are subsequently connected to form a shift register so that the image information may be retrieved. The disadvantage of this system however is that the elements of the detector array generally responds to a given infrared intensity with differing electrical response. This array inhomogeneity is the result of uncontrolled factors in the process of manufacturing the array elements. If one array element has, for example, a lower sensitivity than the others. This produces a spurious darkspot in the perceived image.

Since the response of the most of the elements are normally at least somewhat different from the rest, the output of the system is inhomogeneous.

SUMMARY OF THE INVENTION

The present invention overcomes the disadvantages and limitations of the prior art by providing a device for suppression of the effects of element to element inhomogeneity in an infrared charge coupled image device. Basically, the CCD arrangement is altered so that two charge storage buckets (A and Â) instead of one are used for each element of the infrared scene. First, the scene is optically defocussed so that a first bucket records the average light intensity multiplied by the electro-optic sensitivity of that element. Next, this recorded charge is shifted to a second bucket and stored. This stored charge represents the electro-optic response to a uniform defocussed scene and therefore is a record of the inhomogeneity itself. Finally, the scene is focussed so that the actual image element is recorded in the first bucket together with the unavoidable element inhomogeneity. This homogeneity is removed by substracting the signal stored in the first bucket from the signal in the second bucket. This substraction is performed by a pair of matched capacitors at the end of the CCD register. This is done for each electro-optic element along the register in sequence until the data is shifted out.

It is therefore an object of the present invention to provide an improved charge coupled imaging device.

It is also an object of the present invention to produce an infrared imaging device which is inexpensive and easy to construct.

Another object of the present invention is to provide a device for suppressing the effects of element to element inhomogeneity in an charge coupled device.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
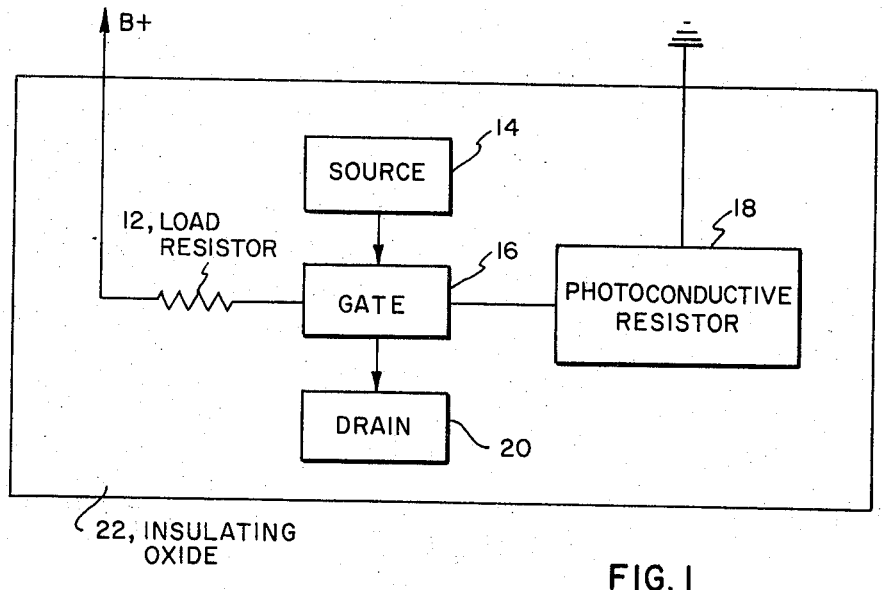
FIG. 1 is a diagram of the preferred embodiment of the invention.

FIG. 1 is a diagram of a single cell of a charge coupled device formerly disclosed by Richard F. Greene et al., in Application Ser. No. 416,300 entitled Photoconductively Activated Gates Infrared Charge Coupled Device filed Nov. 12, 1973, now U.S. Pat. No. 3,842,274. As disclosed therein, the amount of voltage applied to gate 16 varies proportionally with the amount of light energy impingent on photoconductive resistor 18, since the resistance of photoconductive resistor 18 increases with the amount of light applied thereto. Because the voltage level applied to gate 16 controls the flow of charged elements from source 14 to drain 20, the amount of charge in drain 20 is representative of and proportional to the amount of light energy impingent on photoconductive resistor 18.

Figure 2:
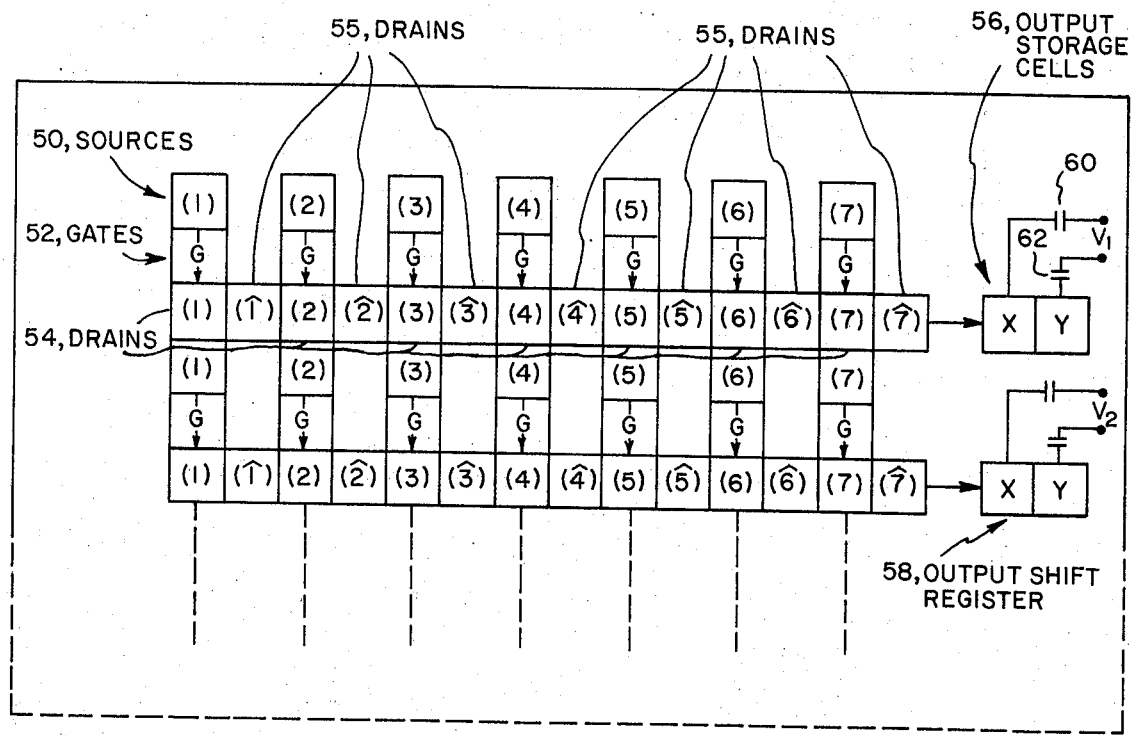
FIG. 2 is a diagram of the gate control overlay circuits of the preferred embodiment.

FIG. 2 is a diagram of the source, gate, and drain portions of the present invention. As shown, a series of gates 52 function to control the transfer of charge from the sources 50 to the drains 54 by way of a photoconductive control circuit as shown in FIG. 1, but now shown in FIG. 2 for purposes of simplicity. The charge transfer occurs over a short period of time, e.g., 1/60 sec., so that the stored charge in each of the drains is proportional to the integrated value of the light energy impingent on the photoconductive resistor (not shown in FIG. 2) for each particular gate of the series of gates 52. By defocussing the input light so that a uniform blurr representative of the average light level from the observed scene is impingent on the series of photoconductive resistors (not shown) a charge can be stored in drains 54 which is representative of the overall response of each of the individual cells. This charge is shifted to drains 55 in the same manner of operation as a shift register. Subsequently, the image is focussed on the device of FIG. 3 and a charge signal of the image is stored in the drains 54. The data stored in drains 54 and 55 is then sequentially shifted down the series of storage buckets to output storage cells 56 so that the charge level on drains 55 is sequentially stored on capacitor 62 and the charge signal on drains 54 is sequentially stored on capacitor 60 for each individual element. The difference is the voltage levels between capacitors 60 and 62, shown in FIG. 2 as voltage $V_1$, is a measure of the true signal level of the image with the inhomogeneity of the particular recording element substracted from the overall recorded signal. In this manner, the inhomogeneity of response of the individual cells is virtually eliminated.

Figure 3:
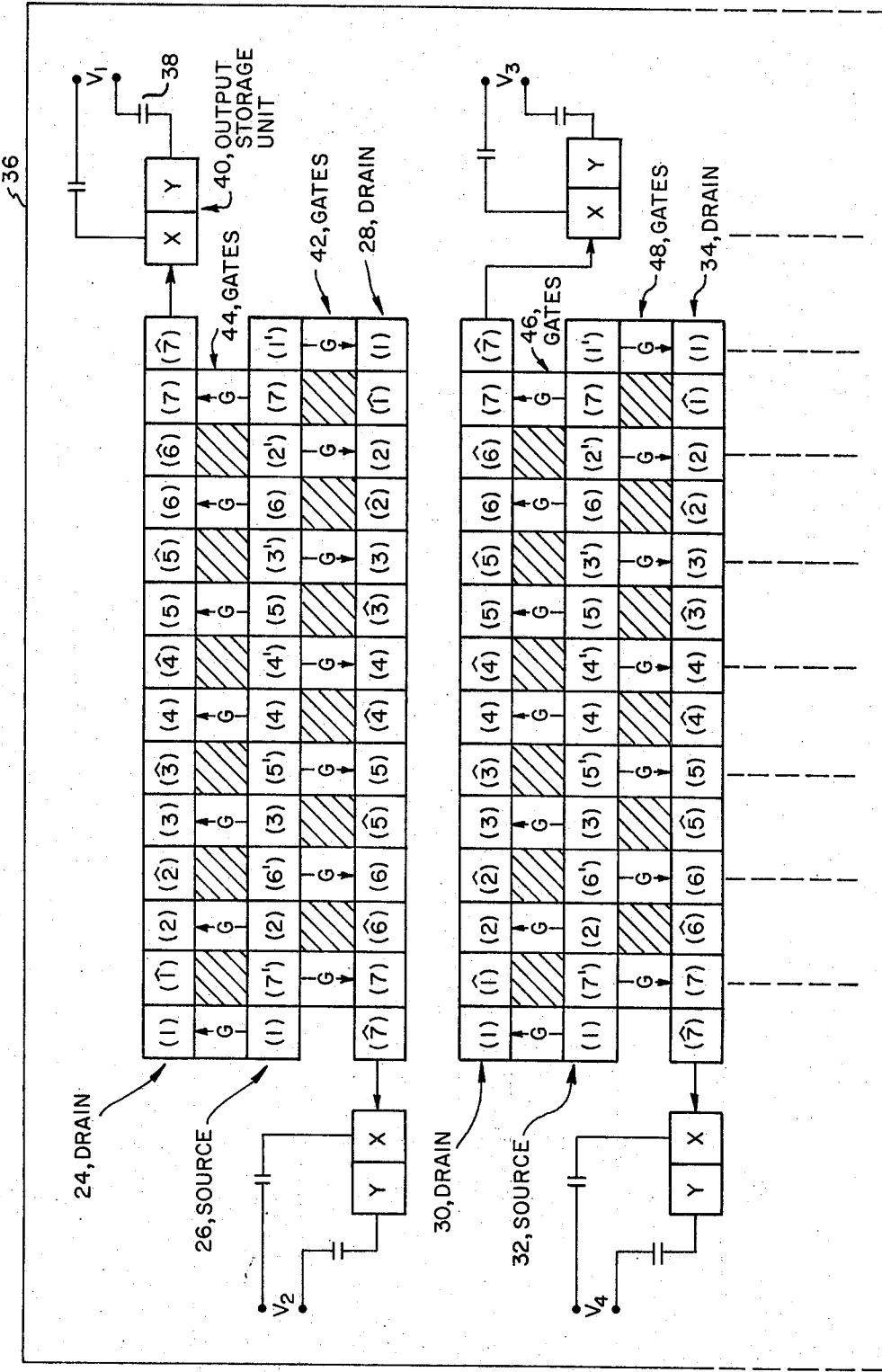

FIG. 3 discloses an alternative arrangement of sources, gates, and drains that may be used to conserve space. As shown, every other source of the series of sources 26 supplies drains 24 with charges. Data is shifted in the drain buckets 24 in the same manner as disclosed above from left to right to output storage unit 40. The remaining source in the series of sources 26 supply the series of drains 28 which shift data from right to left. Depending upon the desired form of output signal, this arrangement may or may not be suitable. If not, then any well known device for reversing signal order may be used in conjunction with the device of FIG. 3 for the purposes of compatibility.

Obviously many modifications and variations of the present invention are possible in light of the above teachings. For example, various devices could be used to periodically defocus the lens. With lenses having extremely short focal lengths, defocussing can be accomplished by axial movements of less than 50 microns. Axial movements on this order can be controlled electrically by using a piezoelectric lens mounting arrangement. In fact, any well known lens defocussing system is suitable with the present device including electromechanical devices.

It is therefore to be understood that within the scope of the appended claims the invention may be practiced otherwise than as specifically described.

What is claimed as new and desired to be secured by the Letters Patents of the United States is:

1. A device for suppression of inhomogeneous responses in the series of elements of a charge coupled imaging device comprising:
   a first series of drain means for storing said responses of each said elements to a uniform blurred image;
   a second series of drain means for storing said responses of said elements to said image in focus;
   means for comparing said stored responses of said first series of drain means with said responses of said second series of drain means to eliminate inhomogeneity.

2. The device of claim 1 wherein said means for comparing said responses comprises capacitors.

3. The device of claim 1 wherein said means for comparing comprises a register.

* * * * *